United States Patent [19]

Brown

[11] Patent Number: 5,073,720
[45] Date of Patent: Dec. 17, 1991

[54] LIQUID LEVEL AND VOLUME MEASUREMENT DEVICE

[75] Inventor: Gair D. Brown, Dahlgren, Va.

[73] Assignee: The United States of America as represented by the Secretary of the Navy, Washington, D.C.

[21] Appl. No.: 561,413

[22] Filed: Jul. 30, 1990

[51] Int. Cl.$^5$ ............................................. G01N 15/06
[52] U.S. Cl. ...................................... 250/577; 73/293
[58] Field of Search ................ 250/577, 576; 356/436, 356/440; 73/293; 340/619

[56] References Cited

U.S. PATENT DOCUMENTS

| | | | |
|---|---|---|---|
| 1,208,830 | 12/1916 | Pratt | 356/346 |
| 1,939,088 | 12/1933 | Styer | 356/346 |
| 3,025,405 | 3/1962 | Dadas | 250/577 |
| 3,065,354 | 11/1962 | Bird | 250/218 |
| 3,068,697 | 12/1962 | Carlson | 73/293 |
| 3,511,572 | 10/1965 | Peube et al. | 356/106 |
| 3,548,657 | 12/1970 | Panerai et al. | 73/293 |
| 3,618,061 | 11/1971 | Livers | 250/577 |
| 3,636,360 | 1/1972 | Oishi et al. | 250/218 |
| 3,713,338 | 1/1973 | Kind | 73/293 |
| 3,741,656 | 6/1973 | Shapiro | 356/342 |
| 3,811,484 | 5/1974 | Engelbrecht | 141/7 |
| 3,908,441 | 9/1975 | Virloget | 73/55 |
| 4,038,650 | 7/1977 | Evans et al. | 340/244 |
| 4,069,838 | 1/1978 | Hansel et al. | 137/392 |
| 4,156,149 | 5/1979 | Vaccari | 250/577 |
| 4,193,004 | 3/1980 | Lobdell et al. | 250/577 |
| 4,354,180 | 10/1982 | Harding | 340/619 |
| 4,448,207 | 5/1984 | Parrish | 128/771 |
| 4,481,595 | 11/1984 | Schiessl et al. | 364/562 |
| 4,604,092 | 8/1986 | Silver | 604/246 |
| 4,630,476 | 12/1986 | Moore | 73/293 |
| 4,762,420 | 8/1988 | Bowley | 356/346 |

Primary Examiner—David C. Nelms
Assistant Examiner—K. Shami
Attorney, Agent, or Firm—John D. Lewis; Kenneth E. Walden

[57] ABSTRACT

The liquid level measurement device is an electro-optical device which uses a light source (typically a light emitting diode (LED) or laser diode) and an optical detector to measure the level of a liquid in a container. The light beam is passed through the liquid and received by the optical detector. The detector output is processed to determine the liquid level or the liquid volume. A special feature is the ability to measure a continuum of fluid levels or volumes.

13 Claims, 3 Drawing Sheets

LIQUID LEVEL AND VOLUME MEASUREMENT DEVICE

ORIGIN OF THE INVENTION

The invention described herein was made in the performance of official duties by an employee of the Department of the Navy and may be manufactured, used, licensed by or for the Government for any governmental purpose without payment of any royalties thereon.

BACKGROUND OF THE INVENTION (1) Field of the Invention

This invention relates generally to a device for measuring liquid level or volume of a contained fluid.

(2) Description of the Prior Art

The prior art of liquid level sensing can be divided into two categories: discrete sensing devices that sense whether a liquid level is above or below a certain point, or distributed sensing devices which transmit varying amounts of light depending upon the liquid level.

Scifres U.S. Pat. No. 4,287,427, filed Jan. 2, 1980 is an example of the latter. In this reference the attenuation of a light guide is changed depending upon the surface area of the light guide contacted by the liquid being measured. The principle used is the difference in the index of refraction between air and the liquid being measured. This approach inherently requires contact with the liquid being measured and cannot be used in case where contact is not allowed. This approach engenders liquid droplets which cling onto the sensor above the actual liquid level and distort the reading. These droplets may be formed from the liquid level being decreased from one level to a lower level.

Other types of sensing devices are essentially on/off sensors and do not allow measurement of liquid level as a continuous quantity (Hansel et al. U.S. Pat. No. 4,069,838, filed Jan. 24, 1978 is an example). These approaches use the local attenuation of light between a source and a detector to tell when the liquid has reached a particular level, or a change in the path of the light beam due to the liquid level which is sensed by the detector as a change in detected light. The Hansel et al. reference uses the attenuation approach. This method can only tell when the liquid level is above a certain point. It cannot give a continuous measurement of the liquid level. Furthermore, it requires contact with the measured liquid. Not all devices of this type require contact, such as Shapiro U.S. Pat. No. 3,741,656, filed June 26, 1973. All methods do suffer from the fact that they cannot give a continuous measurement over the full liquid level range. This is addressed by reference Kind U.S. Pat. No. 3,713,338, filed Nov. 30, 1973 by using multiple single level sensing devices to obtain a somewhat continuous measurement of the liquid level. This approach does require multiple sensors and has limited accuracy dependent upon the number of discrete sensing devices used. Additionally, the Kind reference requires contact with the measured liquid, although this method could be implemented without contact. This approach is one requiring complex hardware.

All prior art located either provides a non-contact measurement or a continuously variable measurement, but not both at the same time. In addition, no prior art reference is known teaching a non-contact measurement device that has a high degree of accuracy over a broad range.

SUMMARY OF THE INVENTION

Accordingly, it is an object of the present invention to provide a liquid level and volume measurement device with an extended measurement range.

It is a further object to teach a device that measures liquid levels and volume over a broad range with a high degree of accuracy.

It is still another object of the instant invention to teach a device having the capability of accurate liquid level and volume measurement without the necessity of contact with the fluid under test or the vessel containing the fluid.

Other objects and advantages of the present invention will become more apparent hereinafter in the specifications and drawings.

In accordance with the present invention, a liquid level and volume measurement device has been designed and constructed which accurately measures fluid levels and volumes of transparent or semitransparent liquids. This method is applicable in the medical industry in measuring liquid volumes in test tubes and beakers or any other application where the liquid container is or can be transparent. The method can be incorporated into automated container filling equipment or into automated quality control/inspection systems. The liquid levels or volumes that are measurable can vary widely. The accuracy of the method can be adjusted by choosing a wavelength of operation which is matched to the liquid level to be measured and the optical attenuation coefficient of the liquid.

This liquid level measurement device utilizes a light source and detector to measure the optical attenuation, and hence, the liquid level of a liquid. The light source may be coupled into an optical fiber and located remotely from the measurement area. The light source may be lensed or may directly transmit light into the fiber or liquid to be measured. The detector may be arranged in a similar manner; being bare, lensed or coupled to an optical fiber. The optical source has associated drive circuitry to produce either a continuous wave (CW) or a modulated signal. The optical detector also has associated circuitry to measure the output voltage of the detector and convert the voltage to liquid level or volume. A lock-in amplifier may be used to measure the detector voltage. A computer may be used to convert the detector voltage to liquid level or volume. The optical source can consist of a lamp with an output at the desired wavelength with appropriate filters or monochrometer or may be an LED or laser diode. Lenses may be used to optimize the coupling of the optical source to a fiber and of a fiber to the optical detector. Lenses may also be used to collimate the optical beam passing through the liquid.

The device may be more clearly understood when turning to the following drawings wherein like elements are consistently numbered throughout the different views and representations.

DETAILED DESCRIPTION OF THE INVENTION

Figure 1:
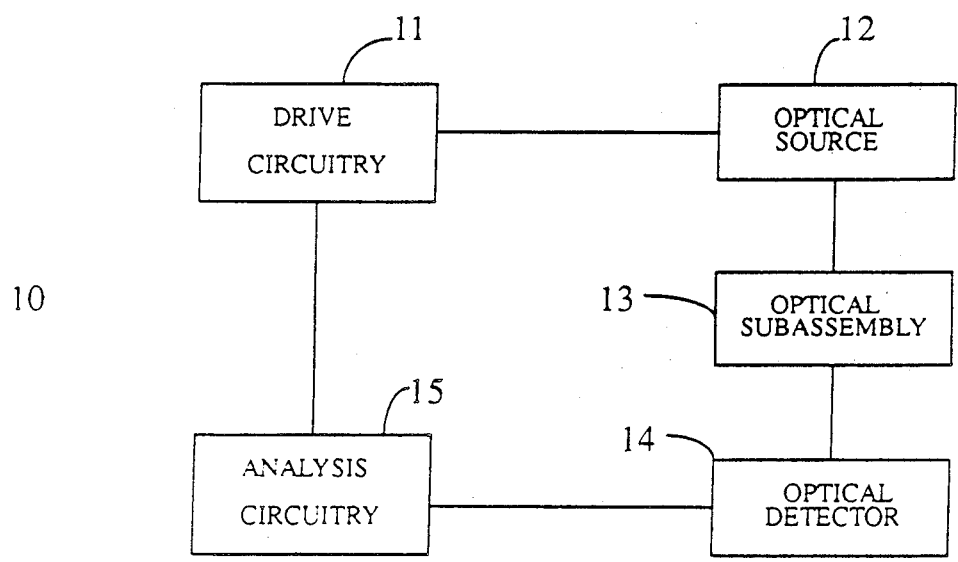
FIG. 1 is a functional block diagram of the liquid level and volume measurement device.

Turning now to FIG. 1, a block diagram of one embodiment of the liquid level and volume measurement device may be viewed. Therein, the invention 10 may be understood as comprising a drive circuit 11, an optical source 12, an optical subassembly 13, an optical detector 14 and analysis circuitry 15.

The drive circuitry 11 for the optical source maintains the average optical power emitted by the source at a constant value over long periods of time. This circuitry may modulate the optical source or may provide a drive current to the optical source so that the optical source operates in a CW fashion. The most sensitive embodiment of the invention is for the drive circuitry to modulate the optical source so that synchronous detection techniques can be used at the optical detector. The drive circuitry is composed of standard electrical components and embodies techniques and circuitry known to those skilled in the art. The exact circuitry is a design choice of the electronics technician. Any circuitry that appropriately stimulates the optical source with a controlled input compatible with the optical choice and detection scheme will be acceptable. Depending upon the optical source and detection parameters, the drive circuitry could be as simple as a constant voltage source such as a battery. In other embodiments of the invention, the drive circuitry would be required to provide constant drive current and might contain a power feedback circuit.

The optical source 12 selected will dictate the parameters of the drive circuitry. The optical source 12 may be either a white light source with appropriate filters or a monochrometer, an LED or a laser diode. The function of the optical source is to emit a constant level of optical power within a specific wavelength band. The optical source 12 is chosen and/or the wavelength controlled to match the spectral properties of the fluid to be measured. Should the fluid be water based, a wavelength would be selected at or near 1300 nanometers in an effort to match the absorptive characteristics of the fluid. Commercially available monochrometers, LED's, and lasers are all available to match the absorption characteristics of most fluids, including the 1300 nanometers required for water based fluid measurements.

Likewise, the optical subassembly 13 may be constructed by an electronics technician using off-the-shelf commercial components. This subassembly simply directs the light emitted by the optical source 12 through the fluid to be measured onto the optical detector 14. Optical subassembly 13 can simply be the air between the optical source 12 and the optical detector 14 in the most simple embodiments, or can be a set of discrete or integrated optical components. The exact configuration will be a design choice corresponding to the application and requirements of other system components.

The optical detector converts the optical energy received from the source to a voltage or current as required by analysis circuitry 15. Standard commercially available detector components are widely available to accommodate the design choices of the technician.

Finally, the analysis circuitry 15 is composed of standard off-the-shelf components and may be constructed as part of the system design. Functionally, the analysis circuitry 15 processes the detector output to determine the attenuation of the optical light beam due to the fluid under test. The attenuation is then correlated to the liquid level or volume of the fluid.

Figure 2:
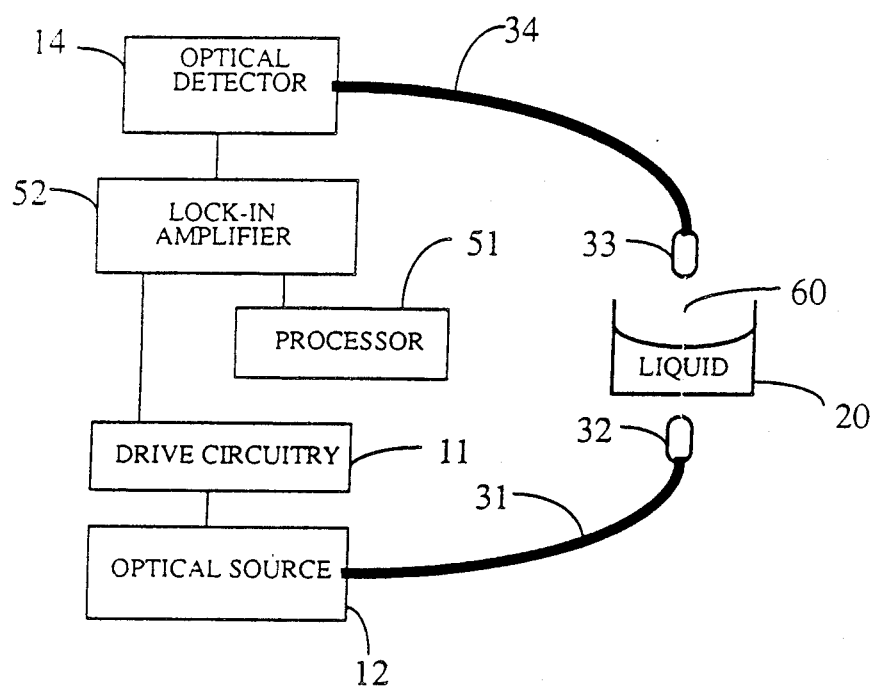
FIG. 2 is one embodiment of the device of FIG. 1 showing placement of optics.

Turning now to FIG. 2, a preferred embodiment of the liquid level and volume measurement device showing a vessel 20 which will contain the fluid to be measured.

The optical subassembly chosen for illustration in FIG. 2 consists of a source optical fiber 31, a launch lens 32, a detection lens 33, and a detection optical fiber 34. Light is launched from the optical source into the source optical fiber where it is guided to the launch lens. At the launch lens the light is collimated and launched through the liquid being measured onto the detection lens. The detection lens focuses the light into the detection optical fiber which guides the light to the optical detector. The optical subassembly may contain other lenses, mirrors, or other optical elements depending upon the application and the physical requirements of the application.

In the embodiment illustrated in FIG. 2 the function of the optical detector 14 is to convert the optical power incident upon it to an output voltage. The output voltage of the optical detector 14 will be given by:

$$V = kP$$

where P is the incident optical power and k is a constant of proportionality for that type of device. The optical detector may be a PIN diode or any other device suitable for the intended application.

The function of the analysis circuitry is to convert the detector output to a liquid level or volume. The embodiment of FIG. 2 employs a detector outputting a voltage as a design choice and the analysis circuitry 15 is constructed accordingly. A processor 51 is employed in FIG. 2 as part of the analysis circuitry used to perform the conversion of the detector output to a liquid level or volume as described below. Any commercial processor can be deployed as required by system design parameters or, in its most simple embodiment, a power meter and manual calculations could be used.

The analysis circuitry illustrated in FIG. 2 includes a locking amplifier 52 so that background light level changes around the liquid level and volume measurement device do not introduce errors into the measurement. Lock-in amplifiers are standard off-the-shelf components and the techniques of their use is widely known to persons of ordinary skill in the electronics and optical arts.

The operation of the liquid level and volume measurement device illustrated in FIG. 2 can be more fully understood with the following description. An initial voltage level is measured without a liquid in vessel 20 so that optical beam 60 may be detected by lens 33 and a reference measurement obtained. The liquid is then inserted into the optical beam 60 and the new voltage level measured. Since the detector output voltage is directly proportional to the power incident to the detector, $$\frac{V_1}{V_o} = \frac{P_1}{P_o}$$

where $V_1$ is the output detector voltage with the liquid inserted in the optical path, $V_o$ is the output detector voltage without the liquid inserted in the optical path, $P_1$ is the optical power incident on the detector with the liquid inserted in the optical path, and is the optical power incident on the detector without the liquid inserted in the optical path. If attenuation (A) is defined as $$A = -10\log\left(\frac{P_a}{P_b}\right),$$

where $P_a$ and $P_b$ are two different power levels, and the inserted liquid is the only change to the setup between the two power measurements, then the attenuation of the liquid is given by $$A = -10\log\left(\frac{V_1}{V_o}\right).$$

The ratio of the optical power transmitted through the liquid ($P_o$) to the optical power incident on the liquid ($P_i$) in the most simple form is given by $$P_o = P_i \exp((-a)x)$$

where $\alpha$ is the attenuation coefficient of the liquid and x is the thickness of the liquid. The attenuation of the liquid is then also given by $$A = -10\log\left(\frac{P_o}{P_i}\right) = -10\alpha x(\log e)$$

The thickness of the liquid is, therefore, directly proportional to the attenuation of the liquid. The volume of the liquid can be determined from the level (thickness) of the liquid and the dimensions of the container.

Figure 3:
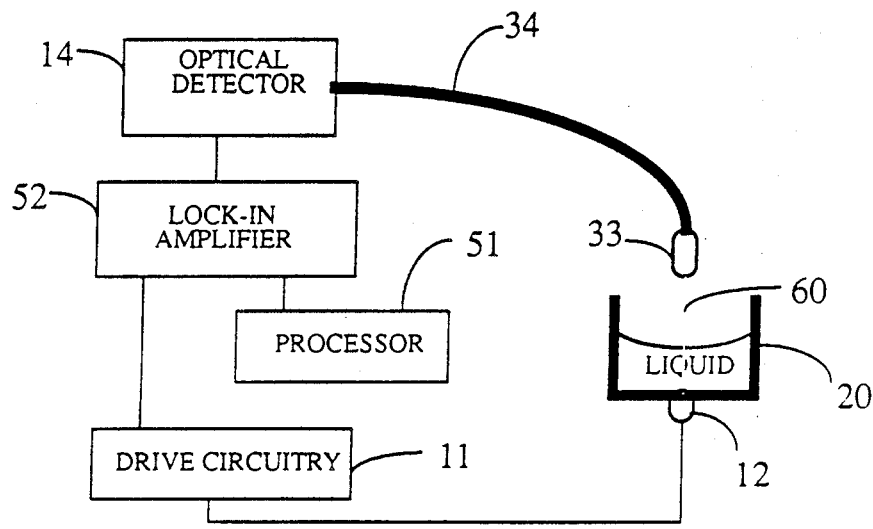
FIG. 3 is an illustration of the liquid level and volume measurement device of FIG. 1 comprising an optical source integral with a vessel.

FIG. 3 illustrates another embodiment of the invention wherein the optical source is an integral part of the vessel 20 containing the fluid. Embodiments of this specie may either incorporate the entire optical source as an integral part of the fluid vessel or simply embed the launch lens therein and connect the launch lens to the optical source with an optical fiber such as is illustrated in FIG. 2. The embodiment integrating the optical source or the launch lens of the optical source may not be the preferred embodiment in applications where it is desired to avoid contact with the vessel containing the fluid to be tested. By integrating part or all of the optical source in the vessel one loses the ability to easily interchange vessels.

Figure 4:
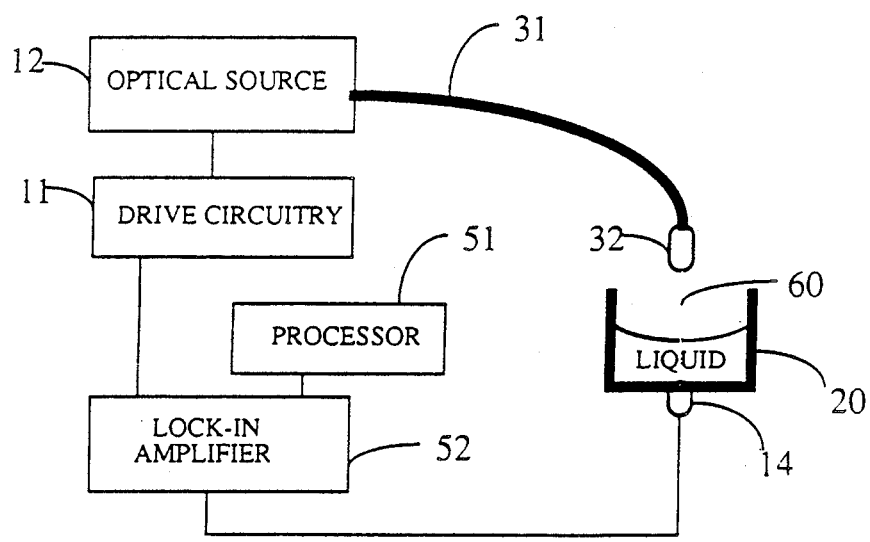
FIG. 4 is an illustration of the liquid level and volume measurement device of FIG. 1 comprising an optical detector integral with the fluid vessel.

FIG. 4 is a further embodiment illustrating a version wherein the detector is an integral part of the vessel. This embodiment would share the shortcomings described above for FIG. 3.

Figure 5:
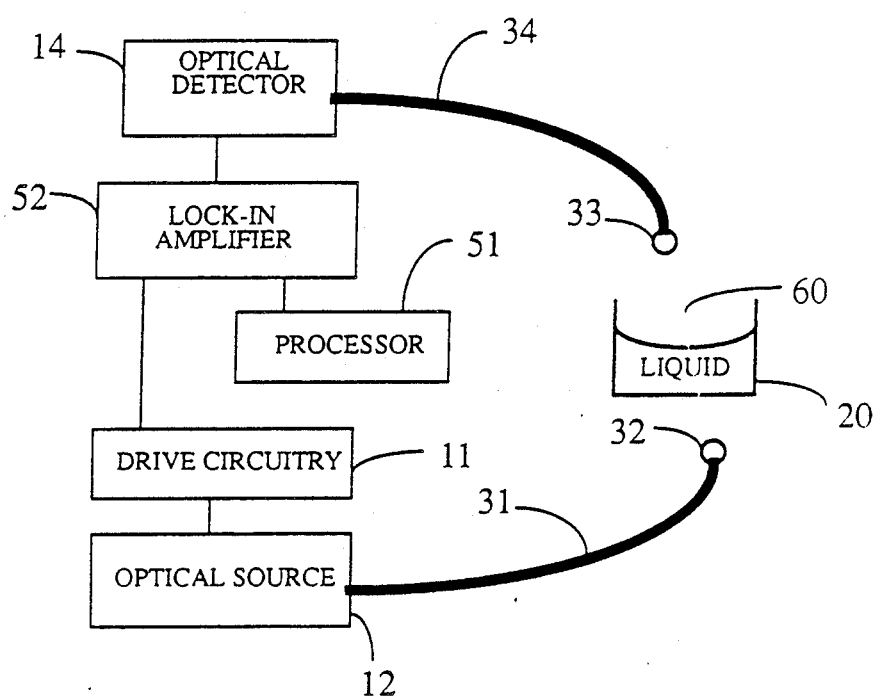
FIG. 5 is an illustration of the liquid level and volume measurement device of FIG. 1 showing an alternate placement of optics.

It is important to note that various embodiments may be constructed wherein the optical light beam is substantially vertical in respect to the fluid under test or the beam could bisect the fluid on a diagonal as shown in FIG. 5.

Obviously many modifications and variations of the present invention are possible in light of the above teachings. It is therefore to be understood that, within the scope of the appended claims, the invention may be practiced otherwise than specifically described.

What is claimed is:

1. A liquid level and volume measuring device for measuring a continuum of liquid levels or volumes of a fluid contained in a transparent or semi-transparent vessel comprising:
    means for emitting a constant power light beam through the depth of the fluid to be measured, wherein said light beam has a wavelength to match spectral absorptive characteristics of the fluid;
    means for detecting said light beam exiting the fluid;
    means for calculating a continuum of fluid levels or volume levels in the fluid under test from the attenuation of said light beam by the fluid.

2. A liquid level and volume measuring device for measuring a continuum of liquid levels or volumes in a transparent or semi-transparent vessel comprising:
    an optical source for generating light having a wavelength that matches spectral absorptive characteristics of a fluid contained in the vessel;
    an optical detector to detect light emitted by said optical source;
    an optical subassembly to direct light from said optical source through the depth of the fluid to be measured onto said optical detector;
    an optical drive circuit to energize said optical source whereby the average light level emitted by said optical source is substantially constant; and
    analysis circuitry to analyze the light detected by said optical detector whereby a continuum of levels and volumes of fluid can be accurately determined by calculating the attenuation of the light emitted by said optical source resulting from the fluid.

3. A liquid level and volume measurement device of claim 1 wherein said optical subassembly comprises optical fibers from said optical source and said optical detector to a pair of lenses operatively spaced on opposing sides of the fluid to be measured.

4. A liquid level and volume measurement device according to claim 1 wherein said means for emitting a light beam is a laser.

5. A liquid level and volume measurement device according to claim 1 wherein said means for emitting a light beam is a LED.

6. A liquid level and volume measurement device according to claim 2 wherein said optical source is a laser.

7. A liquid level and volume measurement device according to claim 2 wherein said optical source is a LED.

8. A liquid level and volume measurement device according to claim 1 wherein said means for emitting is integral with the bottom of the vessel containing the fluid to be measured.

9. A liquid level and volume measurement device according to claim 1 wherein said means for detecting is an integral part of the bottom of the vessel containing the fluid to be measured.

10. A method of determining the level or volume of a fluid in a transparent or semitransparent vessel comprising the steps of:
    (a) directing a controlled constant power beam of light through the depth of the fluid to be measured, wherein the controlled beam has a wavelength to match spectral absorptive characteristics of the fluid;

(b) detecting the controlled beam exiting the fluid;

(c) calculating continuously the level or volume of the fluid by determining the attenuation of the controlled beam exiting the fluid.

11. A liquid level and volume measuring device as in claim 1 wherein the fluid is water based and the wavelength of said light beam is approximately 1300 nanometers.

12. A liquid level and volume measuring device as in claim 2 wherein the fluid is water based and the wavelength of the generated light is approximately 1300 nanometers.

13. A method of determining the level or volume of a fluid according in claim 10 wherein the fluid is water based and the wavelength of the controlled beam is approximately 1300 nanometers.

* * * * *